United States Patent [19]

Conley

[11] Patent Number: 4,880,958
[45] Date of Patent: Nov. 14, 1989

[54] TORCH SUPPORT FOR PLASMA CUTTING SYSTEM

[76] Inventor: James A. Conley, Meadville, Pa.

[21] Appl. No.: 226,449

[22] Filed: Aug. 1, 1988

Related U.S. Application Data

[63] Continuation of Ser. No. 042,058, Apr. 24, 1987, Pat. No. 479,265, and a continuation-in-part of Ser. No. 895,495, Aug. 11, 1986, abandoned, which is a continuation of Ser. No. 713,045, Mar. 8, 1985, Pat. No. 4,633,055.

[51] Int. Cl.[4] ................................. B23K 9/00
[52] U.S. Cl. .......................... 219/121.58; 219/121.48
[58] Field of Search ................ 219/121.36, 121.39, 219/121.58, 121.48, 121.5, 121.51, 121.52, 74, 75, 158–161; 313/231.31, 231.41, 231.51

[56] References Cited

U.S. PATENT DOCUMENTS

| | | | |
|---|---|---|---|
| 4,039,799 | 8/1977 | Stumpf | 219/121.67 |
| 4,063,059 | 12/1977 | Brolund et al. | 219/121.39 |
| 4,097,713 | 6/1978 | Dunshee | 219/121.58 |
| 4,234,777 | 11/1980 | Bafanz | 219/124.32 |
| 4,317,021 | 2/1982 | Walch et al. | 219/121.67 |
| 4,431,902 | 2/1984 | Wallen | 219/76.11 |
| 4,554,431 | 11/1985 | Koeller | 219/121.39 |
| 4,792,657 | 12/1988 | Conley | 219/121.39 |

Primary Examiner—W. H. Paschall
Attorney, Agent, or Firm—Charles 1. Lovercheck; Wayne L. Lovercheck; Dale R. Lovercheck

[57] ABSTRACT

A plasma cutting system comprising a frame, a work support on said frame and a tubular torch support. Gantry means for moving the tubular torch support laterally and longitudinally relative to work on the work support. The torch support is moved a fixed distance from the work and has a ski cup on the lower end of the tubular work support to move over the work. The tube is urged downward by a spring so that as the ski cup runs over the work, the tube is lifted and held at a constant distance from the work. A torch support bearing in the lower end of the torch tube freely receives the torch in the tube.

12 Claims, 2 Drawing Sheets

TORCH SUPPORT FOR PLASMA CUTTING SYSTEM

REFERENCE TO PRIOR APPLICATIONS

This is a continuation of U.S. patent application Ser. No. 042,058, filed Apr. 24, 1987, now U.S. Pat. No. 4,792,657.

This is a Continuation-In-Part of U.S. patent application Ser. No. 895,495 now abandoned, filed Aug. 11, 1986, which is a continuation of U.S. patent application Ser. No. 713,045, filed Mar. 18, 1985, now issued as U.S. Pat. No. 4,633,055 on Dec. 30, 1986.

BACKGROUND OF THE INVENTION

This invention relates to a plasma cutting system of improved efficiency and safety. The improvements of the invention each taken alone or in combination add to operator convenience and productivity and provide equipment portability.

Union Carbide Corporation, Linde Division, Technical Sales Manual, January 1983 entitled "proDUCTor AUTOMATIC SHEET METAL SYSTEM" discloses a computer aided manufacturing system having two parts, a cutting center and an input control terminal. The cutting center consists of a gantry type machine with microprocessor numerical control, a plasma cutting system, one or more down draft cutting tables and a fume-smoke collector.

McNabb in U.S. Pat. No. 3,433,923 and McNabb in U.S. Pat. No. 3,433,922 each discloses an electronic beam welding machine in which an electron beam emitter is heated electrically to provide a focused beam of electrons.

Malmuth et al in U.S. Pat. No. 4,121,087 discloses an apparatus for laser welding which uses power reflected by the surface being welded to control the power input to the weld.

Bateman in U.S. Pat. No. 2,927,992 discloses automatic electric arc welding at a uniform rate along a contoured part.

Takizawa et al in U.S. Pat. No. 4,270,845 and Duruz in U.S. Pat. No. 4,412,120 each discloses a machine for cutting sheet metal by means of a laser beam. In Duruz the sheet metal is placed on a support constituted by a container which moves on a table of the machine while rolling on support balls provided on the table.

Connon et al in U.S. Pat. No. 3,417,222 discloses cutting or drilling nonconducting material with a high energy beam of electrons. The beam is focused into a vacuum work chamber.

Balfanz in U.S. Pat. No. 4,234,777 discloses a programmed welding machine including welding heads carried on a motor driven bridge.

Cecil et al in U.S. Pat. No. 4,010,346 discloses a self-propelled tractor for a welding and cutting apparatus. The tractor has drive and steering wheels.

A common form of metal cutting is on a stationary table requiring the operator to position the metal sheet under the cutter while being exposed to fumes produced during prior cuttings. Such equipment requires loading and cutting in the same location. The present invention improves upon this type of equipment by providing a mobile system including a loading area which is separate from an enclosed cutting area of the machine into which the operator need not enter.

BRIEF DESCRIPTION OF THE INVENTION

The problems of the prior art are overcome by the improved specific torch holder disclosed and claimed herein. The plasma cutting system of the invention includes a constant height plasma cutter, a rolling table and cutting system support. The cutting systems support includes a torch holder support that allows the torch holder to move upwardly against the force of a compression-type helical spring with adjustable tension, which holds a ski cup on the torch holder in contact with the work by a controlled pressure and supports the end of the torch in the torch holder.

In the plasma cutting system of the invention the constant height plasma arc cutter is carried by a gantry driven from opposite sides. The rolling table is loaded in a loading position where the operator positions metal sheets thereon. The operator then rolls the loaded table to a cutting position beneath the plasma arc cutter. The ski cup engages the work and holds the plasma arc cutter at a constant height above the rolling table. Each metal sheet loaded onto the rolling table is supported on the adjustable pins. The entire cutting area is enclosed and vented thus protecting the operator from fumes produced during the cutting operation.

BRIEF DESCRIPTION OF THE DRAWINGS

The objects, features and advantages of the present invention will become more fully apparent from the following detailed description of the preferred embodiment, the appended claims and the accompanying drawings in which:

DETAILED DESCRIPTION OF THE DRAWINGS

Figure 1:
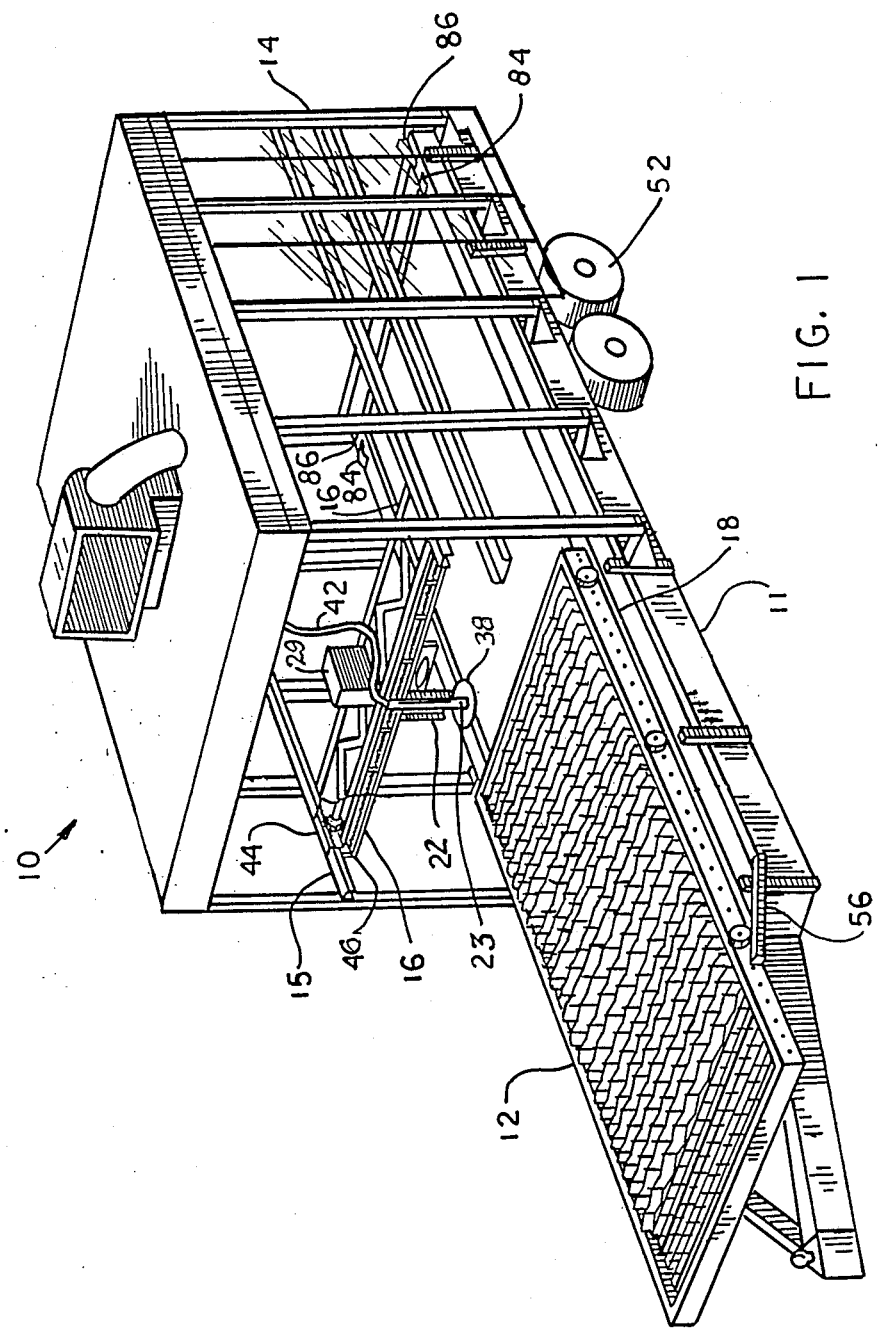
FIG. 1 is a perspective view of a plasma cutting system incorporating the torch support accordance to the invention.
Figure 3:
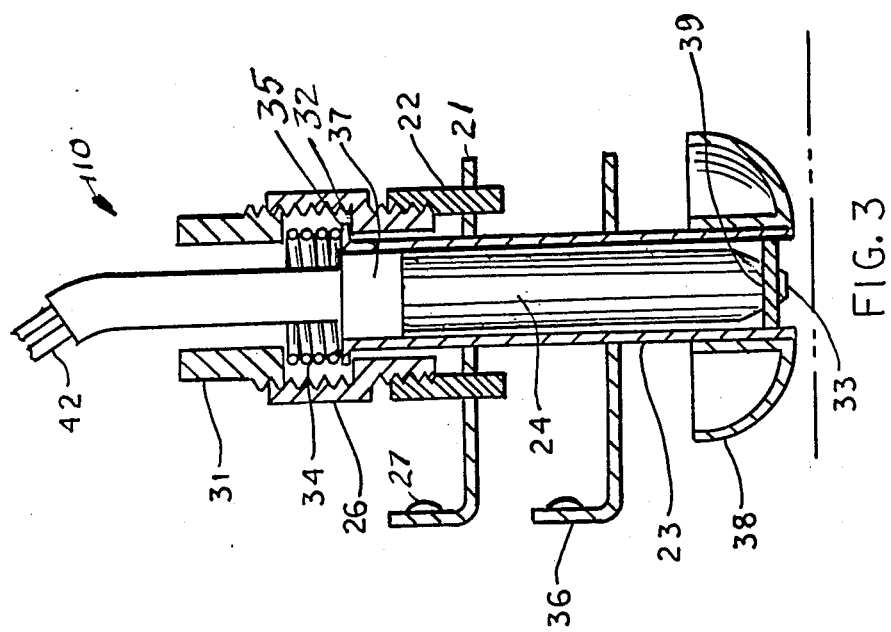
FIG. 3 is a longitudinal cross-sectional view of the torch support according to the invention.
Figure 2:
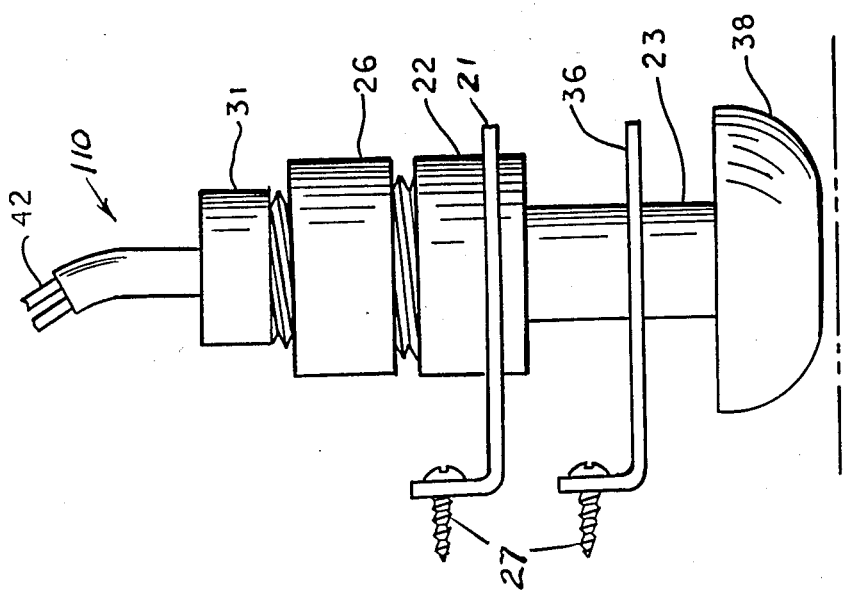
FIG. 2 is a side view of the torch support according to the invention.

The preferred embodiment of the invention is illustrated by way of example in FIGS. 1, 2 and 3. FIG. 1 shows a plasma cutting system 10 in accordance with the invention. The plasma cutting system 10 includes a frame 11, which may be supported on wheels 52, rolling table 12, tracks 18, vertical supports 14 and gantry frame 16 with gantry track 15 having teeth on it. The frame 11 may have a table cutting position 84 and table stop 86.

Rolling table 12 has rollers that roll on track 18. The forward movement of the rolling table 12 is stopped by stop 86. A pinion engages rack 46 to control the lateral movement of the threaded cup 22, which acts as an adusting means, which carries the plasma cutter torch 24. The longitudinal movement of the gantry frame 16 is controlled by a pinion 44 that engages the teeth of gantry frame 15. The lateral and longitudinal movement of the threaded cup 22, with gantry frame 16, is controlled by a control mechanism 29 which may be computer controlled.

The torch support 110, shown in FIGS. 2 and 3, includes the upper bracket bearing 21, threaded cup 22, torch tube 23, torch 24, thimble 26, spring lock 31, helical compression spring 34, lower bracket bearing 36, ski cup 38, which provides for height adjustment, and bearing 39.

Upper bracket bearing 21 can be attached to the gantry frame 16 by means of fasteners 27. The thimble 26 is received in threaded cup 22, which is fixed to the upper bracket bearing 21.

Upper bracket bearing 21 is fixed to the threaded cup 22. Torch tube 23 is telescopically received in the thimble 26. Torch tube 23 is supported on shoulder 32 in the torch tube thimble 26. The torch tube 23 has a shoulder 35 which rests on the shoulder 32 and is engaged by the helical compression spring 34. The helical compression spring 34 is supported from above by the threaded pipe spring lock 31. The compression spring 34 may be controlled by rotating the spring lock 31 into the internal threads of the thimble 26.

The thimble 26 has an internal threads at its upper end and external threads at its lower end. The external threads on the lower end of thimble 26 are received in the internal threads of the threaded cup 22. The lower end of torch tube 23 has bearing 39 inserted in its lower end. The lower end of the torch 24 is received in an opening in the bearing 39. The torch 24 has a sleeve 37 around its outer part that slidably engages the inner periphery of torch tube 23.

The ski cup 38 on the lower end of the torch tube 23 engages the work and slides over the contour of the work, thereby maintaining the lower end of the torch 24 in fixed spaced relation to the work supported on the rolling table 12. The ski cup 38 is slipped over the bottom end of the torch tube 23 and as the ski cup 38 hits bumps on the sheet supported on the rolling table 12, the torch tube 23 can move up and down against the force of the helical compression spring 34 in bracket bearings 21 and 36. The torch 24 itself extends through the helical spring 34 through the spring lock 31 and into the torch tube 23.

The torch tube 23 rides free in the bracket bearings 21 and 36. Thimble 26 can be adjusted up and down by rotating it. The spring lock 31 is screwed into the upper end of the thimble 26 and exerts a pressure on helical compression spring 34. The tip 33 of torch 24 rests on the bearing 39 and aligns the torch 24 in the torch tube 23. The torch 24 is free to rotate in the torch tube 23 so that the wires 42, or gas tubes, attached to the torch 24 do not break. The torch 24 is free to be removed and cleaned without removing any fasteners.

The embodiments of the invention in which an exclusive property or privilege is claimed are defined as follows:

1. A support for a plasma cutting torch comprising an upper bracket bearing and a torch tube,
said torch tube having a torch bearing fixed in its lower end,
a torch having a sleeve along a portion of its length,
said sleeve being slidably received in said torch tube,
said torch resting on said torch bearing,
lower bracket bearing adapted to be attached to a plasma cutting system and shoulder on said upper bracket bearing supporting said torch tube,
said torch having a tip,
a ski cup on the lower end of said torch tube adapted to be moved over work supported on said plasma cutting system whereby said tip of said torch is maintained in a predetermined relation to work supported on said system.

2. The support recited in claim 1 wherein said upper bracket bearing is a bracket attached to a thimble,
said thimble having an opening therethrough for receiving said torch tube,
an upwardly facing shoulder is provided on said thimble,
said torch tube having a shoulder thereon,
said shoulder on said torch tube rests on said upwardly facing shoulder of said thimble.

3. The support recited in claim 2 wherein adjusting means is provided comprising said torch tube, said threaded cup and said thimble whereby said said torch tube can be adjusted vertically in relation to said upper bracket bearing whereby the distance from said tip of said torch to said work on said plasma cutting system can be adjusted.

4. The support recited in claim 3 wherein said adjusting means comprises external threads on internal threads on said threaded cup receiving said thimble.

5. The support recited in claim 3 wherein resilient means is provided,
said resilient means comprises a helical spring,
said helical spring rests on said shoulder and a spring lock engaging said helical spring compresses said helical spring.

6. The support recited in claim 5 wherein pressure is exerted on said helical spring by said spring lock threadably received in said thimble.

7. In combination, a plasma cutting system and a plasma cutting torch support,
said system having a rolling table for supporting sheets of material to be cut,
means to support said torch support for movement longitudinally and laterally of said system,
said torch support comprising a first bracket bearing and a torch tube,
said torch tube having a bearing fixed in its lower end,
a torch having a sleeve along a portion of its length,
said sleeve being slidably received in said torch tube,
said torch resting on said bearing,
said first bracket bearing means attached to said plasma cutting system,
a shoulder supported on said first bracket bearing supporting said torch tube,
said torch having a tip,
a ski cup on the lower end of said torch tube adapted to be moved over work supported on said plasma cutting system whereby said tip of said torch is maintained in spaced relation to work supported on said system.

8. The combination recited in claim 7 wherein said first bracket bearing includes a bracket and means on said bracket attaching said bracket to a thimble,
said thimble having an opening therethrough receiving said torch tube,
said means supporting said torch tube further comprises an upwardly facing shoulder on said thimble,
said torch tube having a shoulder thereon,
said shoulder on said torch tube resting on said shoulder on said thimble.

9. The combination recited in claim 8 wherein said thimble has vertical adjusting means thereon whereby said torch tube can be adjusted vertically in relation to said first bracket bearing whereby the distance from said bearing to said work on said plasma cutting system can be adjusted.

10. The combinatin recited in claim 9 wherein said adjusting means comprises external threads on said thimble and an internally threaded sleeve on said first bracket bearing receiving said thimble.

11. The combination recited in claim 10 wherein resilient means is provided, said resilient means comprises a helical spring resting on said shoulder and means engaging said helical spring to compress said helical spring.

12. The combination recited in claim 11 wherein pressure is exerted on said helical spring by a spring lock threadably received in said thimble.

* * * * *